United States Patent
Vath

[15] 3,687,246
[45] Aug. 29, 1972

[54] BRAKE ASSEMBLY
[72] Inventor: William Vath, Massapequa, N.Y.
[73] Assignee: Long Island Mold and Tool Corporation, Westbury, N.Y.
[22] Filed: Oct. 19, 1970
[21] Appl. No.: 81,906

[52] U.S. Cl..................................188/329, 188/332
[51] Int. Cl...............................................F16d 51/12
[58] Field of Search...............188/329, 330, 331, 332

[56] References Cited

UNITED STATES PATENTS

| 1,994,820 | 3/1935 | Herve | 188/332 |
| 2,095,808 | 10/1937 | Goepfrich | 188/331 X |
| 1,767,621 | 6/1930 | Shields et al. | 188/329 X |

FOREIGN PATENTS OR APPLICATIONS

| 973,248 | 2/1951 | France | 188/329 |
| 245,563 | 1/1926 | Great Britain | 188/332 |

Primary Examiner—Evon C. Blunk
Assistant Examiner—Johnny D. Cherry
Attorney—Robert R. Strack and James A. Eisenman

[57] ABSTRACT

A floating pivot brake assembly suitable for die cast injection molding having variable diameter pivot means mounted on a threaded shank which is accessible for brake adjustments from the outside of the assembly.

8 Claims, 6 Drawing Figures

PATENTED AUG 29 1972 3,687,246

INVENTOR.
WILLIAM VATH

BY Eisenman and Strack
ATTORNEYS

PATENTED AUG 29 1972

INVENTOR.
WILLIAM VATH

BY *Eisenman and Strack*
ATTORNEYS

BRAKE ASSEMBLY

BACKGROUND OF THE INVENTION

1. Field of the Invention

This invention relates to brake assemblies; and more particularly to floating pivot brake assemblies which are ideally suited for die casting injection molding.

2. Description of the Prior Art

Friction brakes which operate within a brake drum are well known. Conventionally, such brakes comprise a pair of brake shoes each of which are mounted to pivot at one end as a result of a camming action applied at the other end. Although apparently never commercially adopted, it has also been proposed to have the pivot means provided with a radius adjustment in order to effect what is known as a brake adjustment. Such brake adjustments relate to the general increasing of the diameter of the brake shoes in combination so that they are closer to the brake drum in their quiescent state. Quite clearly, it is desirable to adjust brake shoes, or brakes, from outside the normally enclosed brake drum chamber. A number of other techniques have been developed for doing this, including modification of the spring tension normally applied to hold the shoes together.

In the assembly of a brake, it is necessary to insert or install the assembled pair of brake shoes within the brake drum. The initial mounting of the shoes on a backing plate is often a difficult one due to the fact that strong springs are required and these springs must be properly positioned in order to hold the shoes in place. The subsequent installation of the brakes into the drum may also be difficult because the diameter of the shoes, when compressed to their maximum amount, is very close to the internal diameter of the drum within which they must fit. In general, this particular problem has been overcome by either using precision made brake linings, or grinding the linings down to initially fit within the drum. Heretofore, it has been necessary to hold close tolerances.

In the manufacture of brake assemblies, one is also concerned with the metals and the machining steps required. Where one is concerned with the production of an economical, yet efficient, brake, it has been found to be of great advantage to die cast the components. When this manufacturing technique is employed, the specific design of the brake assembly must take maximum advantage of the characteristics of this production technique and also may benefit from the unique characteristics made available.

SUMMARY OF THE INVENTION

The present invention relates to a brake assembly specifically designed for production by die casting techniques. Nevertheless, the characteristic features of the invention will be seen to be applicable and to advantage in connection with brakes manufactured in other conventional ways.

It is an object of the present invention to provide an improved brake assembly.

It is another object of the invention to provide an improved brake assembly having a floating adjustable pivot for the brake shoes.

It is another object of the invention to provide an improved brake assembly wherein the floating pivot has a unique structure whereby the brake may be easily adjusted with conventional tools.

It is another object of the invention to provide a design for an improved brake assembly which does not require the use of costly machining operations.

It is another object of the invention to provide an improved brake assembly having a minimum of component elements, each of which may be die cast.

Another object of the invention is to provide a unique brake assembly which may be conveniently assembled with a minimum of labor and special tools.

In accordance with the invention, there is provided a brake assembly comprising a backing plate, a pair of shoes arranged end to end and disposed adjacent to the surfaces of said backing plate, one pair of facing ends of said brake shoes being urged into contact by tensioned means and being separated by a pivot means, and the other pair of facing ends of said brake shoes being urged apart by cam means; said one pair of facing ends forming opposed substantially conical chambers coaxially disposed with adjacent apices, the axis of said substantially conical chambers being orthogonal to the backing plate. The pivot means comprises a pair of elements supported solely by the brake shoes and each being positioned in surface contact with the walls of one of said substantially conical chambers.

The above objects will be more clearly understood and appreciated, along with other objects and the unique features of the invention, from the following detailed description of the invention which is made with reference to the attached drawings.

DESCRIPTION OF A PREFERRED EMBODIMENT

Figures 1, 2, 6:
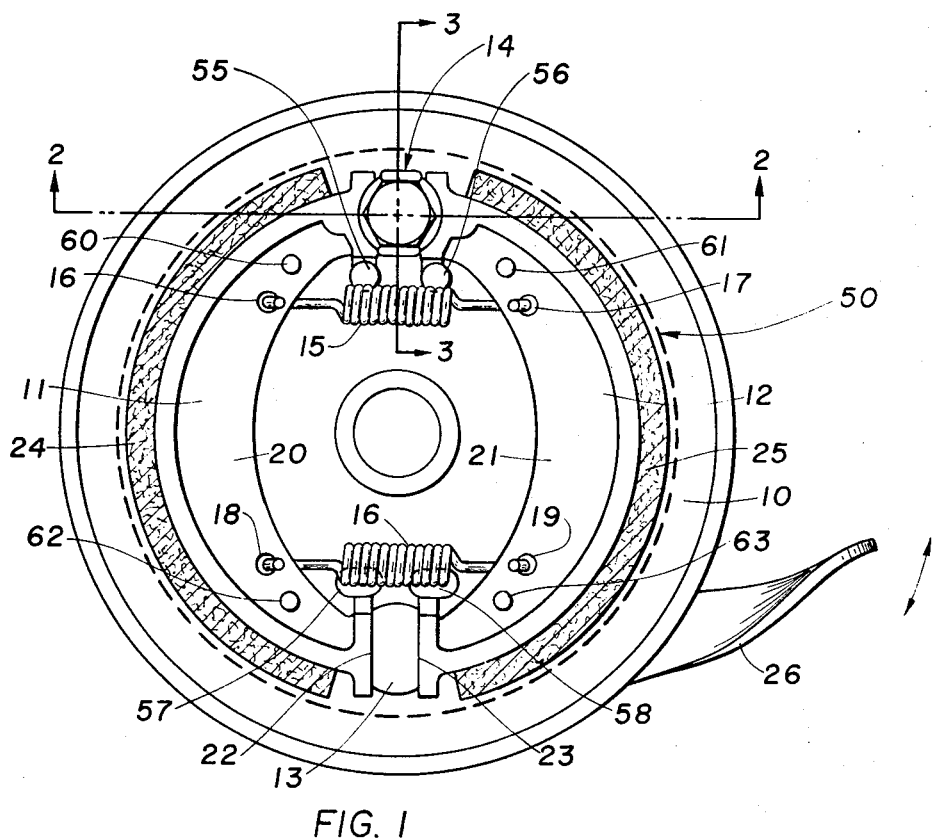
FIG. 1 is a view of a brake assembly embodying the features of the present invention.
FIG. 2 is a cross-sectional view taken along the lines 2—2 shown in FIG. 1.
FIG. 6 is an exploded view of the adjustable pivot means provided for adjusting the brakes of the invention.
Figure 3:
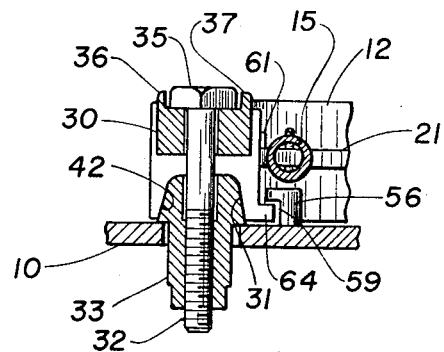
FIG. 3 is a cross-sectional view taken along the lines 3—3 in FIG. 1.
Figure 5:
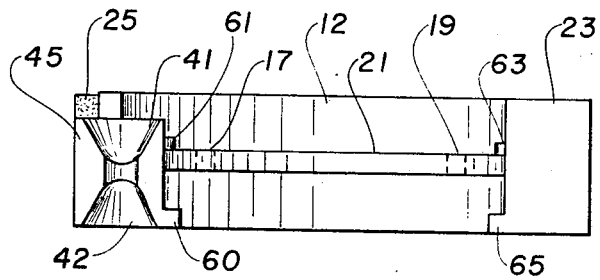
FIG. 5 is an elevation view of the right hand brake shoe shown in FIG. 1, viewed from the center of the assembly.

The embodiment illustrated in FIGS. 1–5, comprises a brake assembly arranged for seating within a brake drum. The drum is not illustrated. The principal components of the brake assembly are backing plate 10, a pair of shoes 11 and 12, an actuating cam 13, and adjustable pivot means 14. Springs 15 and 16 are in tension and are mounted in apertures 16, 17 and 18, 19 respectively, located on internally projecting ribs 20 and 21 of the brake shoes. It will be appreciated that the position of the cam 13 shown in FIG. 1 is the unactuated condition of the brake. In order to actuate this brake assembly, the cam 13 is rotated about an axis through its center. As a result of such rotation, the cam bears against the faces 22 and 23 of the brake shoes, forcing them apart. These shoes accordingly move apart, pivoting about pivot means 14 until brought into frictional bearing contact with the internal circumference of a surrounding brake drum. The location of surface of such a drum is suggested by dashed line 50.

Each brake shoe has a lining 24 or 25 thereon. The lining may be bonded to a flanged shoe surface in any convenient manner. Its main characteristic is its ability to retain its integrity and create friction upon surface contact with the brake drum.

Cam 13 is connected by means not shown, to an actuating lever 26 which is rotatable in either a clockwise or counter-clockwise direction. The operation of lever 26 is effective to rotate cam 13 about its axis and consequently is effective to apply the brakes.

The floating adjustable pivot means 14 may be more clearly understood and appreciated from a study of FIGS. 2-6. Considering FIG. 6 first, there is an exploded view of the pivot means itself. This pivot means includes first and second die cast frustum portions 30 and 31, and a threaded bolt member 32. Each portion has a bore therethrough, adapted to receive bolt member 32 which may include a hexagonal or octagonal head 35 adapted for engagement by conventional tools. The lower frustum portion 31 includes an axially extended bearing portion 33. Bearing portion 33 is of some predetermined diameter, relative to the width of pivot slot 51 in the backing plate 10. The significance of this dimensioning is discussed hereinafter. The lower frustum portion 31 may have as an integral part thereof a hexagonal nut suitable for engagement by conventional tools. It is threaded for engagement with the threaded portion 34 of bolt member 32.

Upper frustum portion 30 has oppositely disposed axially extending radial projections 36 and 37 which coact with the flat surfaces of head 35 in order to prevent rotation of frustum 30 relative thereto. These projections 36, 37 extend along the length of the frustum 30 for a limited distance and provide guide means for positioning frustum 30 within the aperture formed between the proximate ends of the brake shoes in bearing contact with the pivot means. The bore through upper frustum 30 is dimensioned for sliding contact with the unthreaded shank of bolt member 32.

When the pivot means 14 are assembled with a pair of brake shoes, the conical elements 30 and 31 reside within what amounts to a pair of substantially conical chambers. This will be understood most clearly from a consideration of FIGS. 2, 3, and 5. These chambers are formed by the confronting end faces of the respective shoes. Thus, for example, shoe 12 has an end face 45 with upper and lower cavities therein which make up the sector of a cone. The upper cavity 41 appears in the upper right portion of FIG. 2, and the lower cavity 42 appears in the lower right portion. These cavities are dimensioned to cooperate with the sloping faces of conical portions 30 and 31, respectively. As a result of the tensioning effect of the springs 15 and 16, the end faces 40 and 45 of the shoes are forced into bearing contact with the surfaces of cones 30 and 31. Thus, when the brake is applied, the pivot action takes place at the interface of these various surfaces.

It will be apparent that frustums 30 and 31 may be adjusted axially relative to one another simply by the tightening, or the advance, of the lower frustum 31 toward the upper frustum 30. This is effected by the application of a conventional tool to the integral nut 33. Assuming a right hand thread is employed, clockwise roation of the lower frustum will result in the advance thereof and the tightening of the brake adjustment. Conversely, counter-clockwise rotation of integral nut 33 will result in the withdrawal thereof and the consequent loosening of the brake adjustment.

The remote end of the pivot means containing frustum 31 extends beyond the backing plate 10 through a pivot slot 51. There is no fixed connection between the backing plate and the pivot means 14 and accordingly it is floating, supported only by the brake shoes 11, 12 themselves. This fact introduces several important considerations. It will be recalled that operation of the brake assembly entails pivoting the shoes 11, 12 about pivot means 14. Although it is advantageous to have the pivot movable in order to effect centralization of the shoe assembly within the drum, it is extremely important to provide a stable pivot point. These somewhat antithetical requirements are met by the proper dimensioning of the pivot slot 51 in relation to the cooperating bearing surface 33 of the pivot means.

Figure 4:
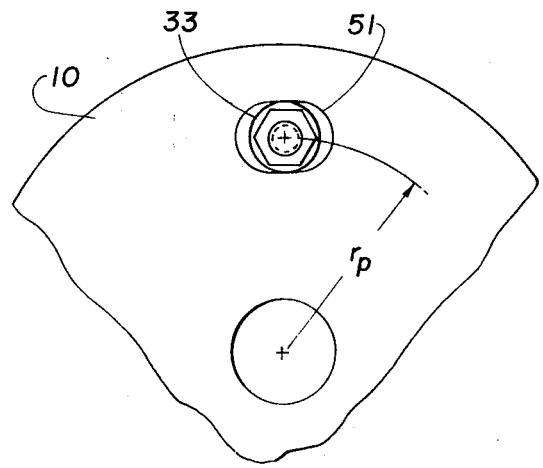
FIG. 4 is a partial back view illustrating the adjustable pivot means and pivot slot from the outer face of the backing plate.

As shown in FIG. 4, slot 51 is elongated along an axis having a fixed radius, $r_p$, relative to the center of backing plate 10. The radial width of slot 51 is only slightly greater than the diameter of the bearing portion 33 of the pivot means. Thus, when the cam 13 is activated, the pivot point of the brake shoes is a predetermined distance from the center of the brake assembly and, in this respect, the pivot point is stable. On the other hand, due to the elongation of slot 51, the shoe assembly is free to move and centralize within the drum.

Quite obviously, when a floating pivot means is employed, it is advisable to prevent the separation of the brake shoes 11, 12 from the backing plate 10, and means must be provided to retain them proximate thereto. These means comprise lugs 55-58 which appear in FIG. 1. These lugs are an integral part of the backing plate and are cast when the backing plate is originally cast. They are then undercut parallel to the backing plate surface as illustrated with respect to the lug 56 in FIG. 3. The undercut portion 59 is adapted for coaction with a projection 60 that is an integral part of the end face of the adjacent brake shoe 12. Thus, the brake shoes are unable to move in a direction perpendicular to the back plate 10. It is important to note that both projection 60 and the corresponding projections from the faces of the brake shoes and the lugs 55-58 are integral portions of the members to which they are attached.

Attention is also directed to the lugs 60-63 shown in FIG. 1. These lugs project perpendicularly from the ribs 20 and 21 of the brake shoes. Their function is to provide a pivot point for the rotation of a spring applying tool while placing springs 15 and 16 into their respective apertures in the shoes. With these projecting lugs, one is able to assist the manual assembly of the brake without any extra tool or special tool or device.

In order to assemble a brake comprising the components illustrated and discussed hereinabove, one initially affixes spring member 16 in the apertures 18 and 19 of a pair of brake shoes. The components are then separated sufficiently to fit over cam member 13 and to slip under the lugs 57 and 58. At this time, the shoes are in position against the backing plate 10. The upper end faces of each shoe are then separated and pivot means 14 is inserted to place bearing portion 33 within pivot slot 51. When inserted, the shoulder between bearing portion 33 and frustum portion 31 rests against the inner surface of the backing plate. By further expansion of the brake shoes, the lugs 55, 56 and cooperating projections, e.g., 60, on the end faces of the shoes 11, 12 are engaged. Assembly is now essentially completed. It merely remains to position the unit within the cooperating brake drum. Mention has been made previously of the difficulties encountered in the relatively inexpensive brake units used for small vehicles. These difficulties include the problem that conventional brake linings 24, 25 vary in thickness and consequently the total diameter of the brake assembly may vary sufficiently to make it virtually impossible to fit within the brake drum without the ability to reduce the size of the pivot means. This difficulty is completely obviated by the present invention because adjustable pivot means 14 can be released to its minimum radial effect in order to permit the brake shoes maximum contraction. It is thus both easy and economical to provide for the assembly and production of brakes.

A specific embodiment of the invention has been shown and described. This embodiment is of particular advantage where one fabricates the components by die casting. On the other hand, a number of the unique features illustrated hereinabove are applicable to other forms of brake manufacture. In addition, modification in the various components will become immediately apparent to those skilled in the art. All such modifications, as embraced in the following claims, are intended to come within the scope of the present invention.

What is claimed is:

1. A brake assembly comprising a backing plate, a pair of shoes arranged end to end and disposed adjacent to the surface of said backing plate, one pair of facing ends being urged into contact by tensioned means and the other pair of facing ends being urged apart by cam means, said one pair of facing ends forming a pair of opposed substantially conical chambers coaxially disposed with adjacent apices, the axis of said substantially conical chambers being orthogonal to said backing plate; and a pair of pivot means supported solely by said brake shoes and each being positioned in surface contact with the walls of one of said chambers, each of said pivot means being a frustum, said frustums being positioned with their apices in proximity, one of said pivot means including a substantially cylindrical bearing portion extending axially from the large diameter end of said frustum, and comprising an elongated aperture in said backing plate having a width substantially equal to the diameter of said bearing portion, the axis of said elongation being at a fixed radius from a predetermined point within said brake assembly, and said bearing portion being positioned within said elongated aperture.

2. A brake assembly in accordance with claim 1, including means for mounting said pivot means with their axes coaxial with the axis of said substantially conical chambers, and for adjusting the space therebetween, said means being adjustable from the remote surface of said backing plate.

3. A brake assembly according to claim 1, wherein said frustums being mounted upon a member having threads extending over a predetermined portion, one of said frustums being in engagement with the threaded portion of said member and the other of said frustums being in sliding contact with the unthreaded portion thereof.

4. A brake assembly according to claim 1, wherein said one pair of facing ends are separated by at least a predetermined amount and wherein one of said pivot means includes guide means adapted for translation along the opening defined by said separation.

5. A brake assembly according to claim 4, wherein each of said pivot means is a frustum, and said guide means comprise at least one projection of substantially constant radial length extending from the surface of one of said frustums for a predetermined axial length, said guide means having an arcuate width approximately equal to the predetermined amount of said separation.

6. A brake assembly according to claim 1, wherein each brake shoe includes a reinforcing rib extending inwardly therefrom in a position parallel to said backing plate, said tensioned means being mounted between said shoes via apertures on said ribs, and integral projections on said ribs adjacent to said apertures for mounting said tensioned means thereon.

7. A brake assembly according to claim 1, including cooperating projections at said one pair of facing ends and on said backing plate extending parallel to the surface of said plate, said projections being operative to prevent movement of said shoes in a direction orthogonal to said surface.

8. A brake assembly according to claim 1, wherein each of said one pair of facing ends have a pair of depressions on the face thereof, each of said depressions being in the form of a sector of a cone and said sectors being disposed along a common axis with their apices in proximity.

* * * * *